(12) United States Patent
Tobinaga et al.

(10) Patent No.: US 8,970,752 B2
(45) Date of Patent: Mar. 3, 2015

(54) IMAGING DEVICE

(71) Applicant: Panasonic Corporation, Kadoma-shi, Osaka (JP)

(72) Inventors: Masato Tobinaga, Hyogo (JP); Hirotsugu Fusayasu, Kyoto (JP); Masafumi Kumoi, Osaka (JP); Ryuichi Nagaoka, Osaka (JP); Yoshio Nishizawa, Osaka (JP); Atsushi Inoue, Tokushima (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 82 days.

(21) Appl. No.: 13/721,056

(22) Filed: Dec. 20, 2012

(65) Prior Publication Data
US 2013/0107114 A1 May 2, 2013

Related U.S. Application Data

(63) Continuation of application No. PCT/JP2012/002687, filed on Apr. 18, 2012.

(30) Foreign Application Priority Data

Jul. 1, 2011 (JP) ................................. 2011-147745

(51) Int. Cl.
*H04N 3/14* (2006.01)
*H04N 5/225* (2006.01)
(Continued)

(52) U.S. Cl.
CPC ............ *H04N 5/2253* (2013.01); *H04N 5/3577* (2013.01); *H04N 2101/00* (2013.01)
USPC ............ 348/294; 348/374; 348/373; 358/482

(58) Field of Classification Search
CPC ... H04N 5/2253; H04N 5/2254; H04N 5/335; H04N 5/378
USPC .................. 348/76, 294, 335, 373, 374, 375; 257/692, 294, 433, 434, 435; 445/51; 358/482, 483; 250/208.1
See application file for complete search history.

(56) References Cited

U.S. PATENT DOCUMENTS

2002/0179821 A1* 12/2002 Aibara et al. ............. 250/214 A
2009/0174947 A1* 7/2009 Hasegawa ................... 359/642
(Continued)

FOREIGN PATENT DOCUMENTS

EP 1389898 A1 * 2/2004 ............... H05K 7/10
JP H02-088240 U 7/1990
(Continued)

*Primary Examiner* — Aung S Moe
*Assistant Examiner* — Xi Wang
(74) *Attorney, Agent, or Firm* — James W. Judge

(57) ABSTRACT

An imaging device includes: an imaging sensor 110 configured to capture an optical image of an object and generate image data; a main circuit substrate 120 configured to perform signal processing of the image data generated by the imaging sensor 110; a mounting component 130 configured to mount the imaging sensor 110; a metal plate 150 disposed between the mounting component 130 and the main circuit substrate 120; and an electrically-conductive section 190 configured to electrically connect between a ground conductor of the main circuit substrate 120 and the metal plate 150. The electrically-conductive section 190 is positioned in an area where the metal plate 150 and the imaging sensor 110 overlap each other in the case of a back surface of the metal plate 150 being viewed in a direction orthogonal thereto.

7 Claims, 10 Drawing Sheets

(51) Int. Cl.
*H04N 1/04* (2006.01)
*H04N 5/357* (2011.01)
*H04N 101/00* (2006.01)

(56) References Cited

U.S. PATENT DOCUMENTS

2010/0167459 A1* 7/2010 Jung ............................. 438/73
2010/0309353 A1* 12/2010 Hagiwara ..................... 348/294
2012/0155854 A1* 6/2012 Huang et al. .................. 396/535

FOREIGN PATENT DOCUMENTS

| | | |
|---|---|---|
| JP | H06-349914 A | 12/1994 |
| JP | 2004-079946 A | 3/2004 |
| JP | 2006-211049 A | 8/2006 |
| JP | 2008-211378 A | 9/2008 |
| JP | 2009-060459 A | 3/2009 |
| WO | WO-2009-144898 A1 | 12/2009 |

* cited by examiner

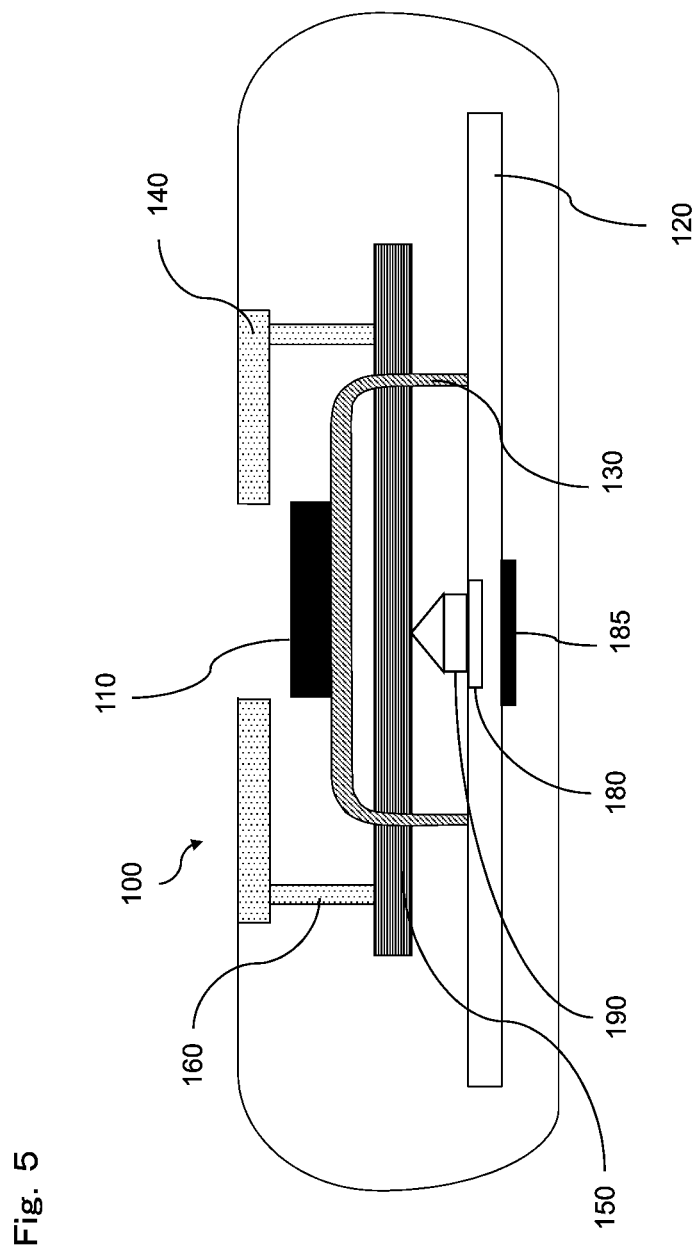

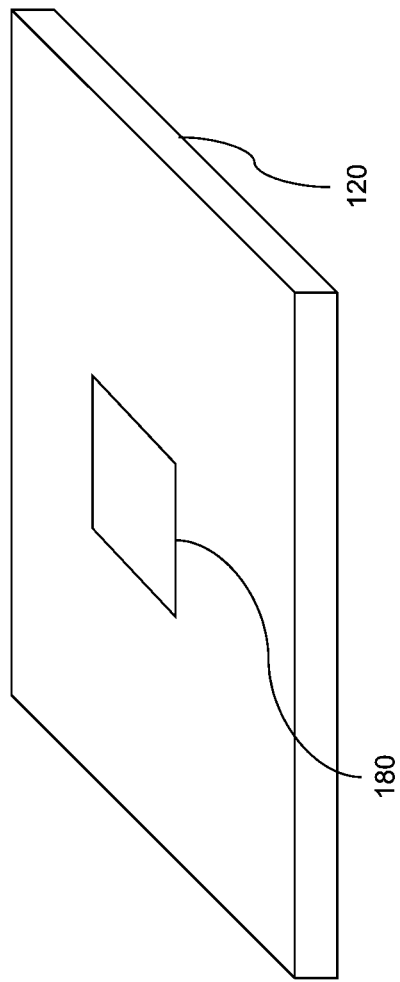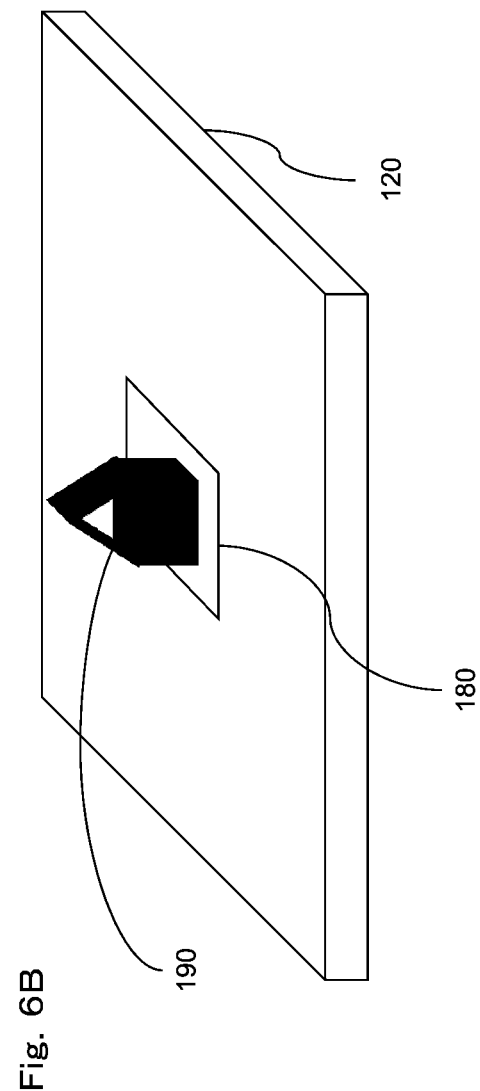

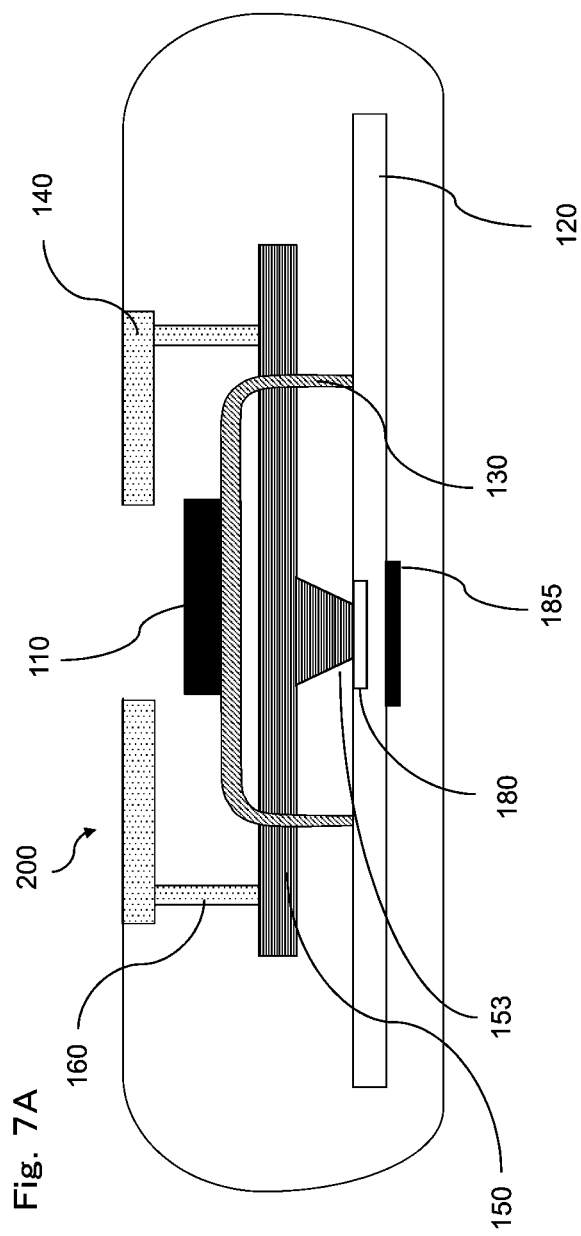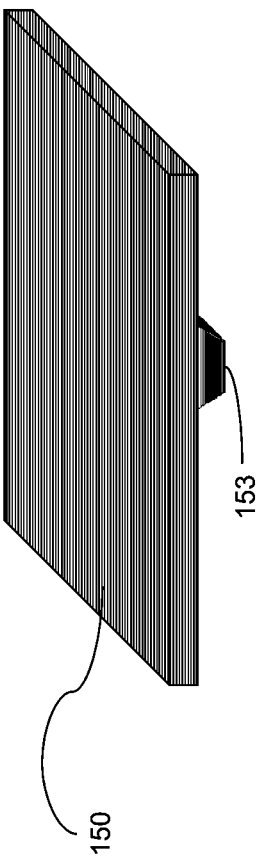

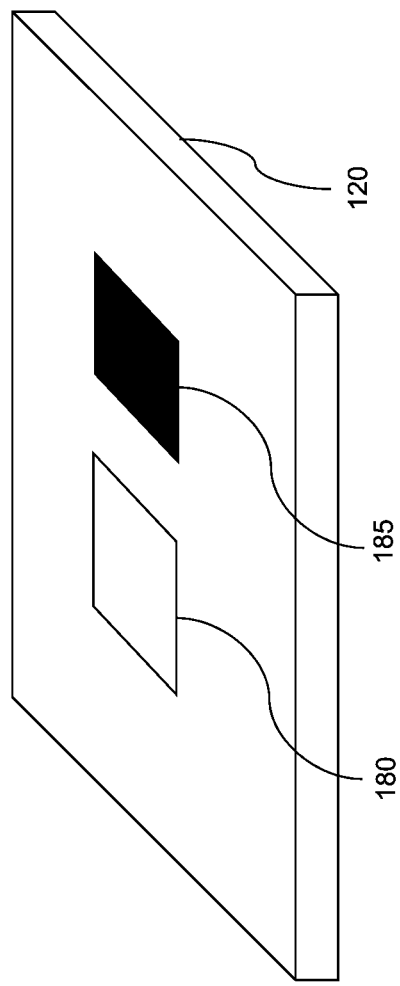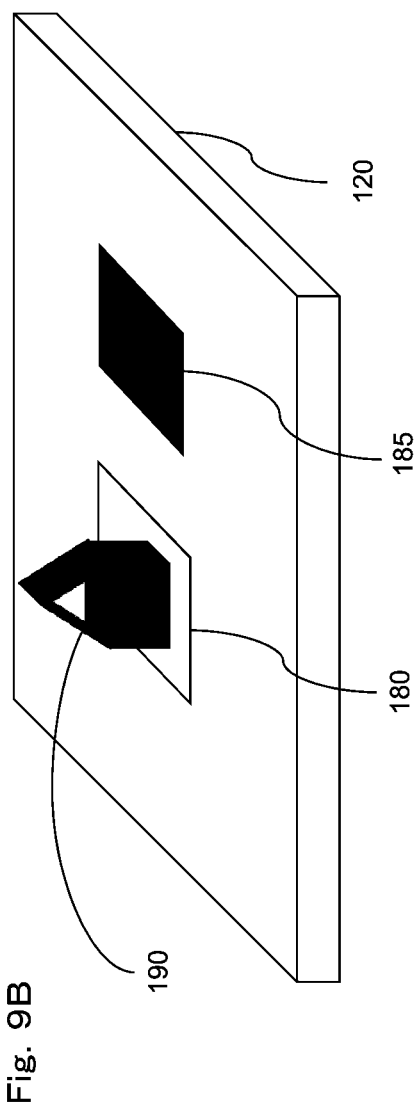

IMAGING DEVICE

BACKGROUND

1. Field

The present disclosure relates to imaging devices such as digital still cameras and the like, and more particularly to imaging devices that allow image interference caused by an external noise to be reduced.

2. Description of the Related Art

In recent years, opportunities are increased in which imaging devices such as digital still cameras and the like are used in environments where portable information terminals, such as mobile telephones and PHSs (personal handyphone systems), which emit electromagnetic waves, are used. Further, there may be opportunities of imaging devices such as digital still cameras and the like being used in environments where intense electromagnetic waves are emitted, e.g. at or near a radio station or a television station.

In a case where the imaging device is used in such an environment, the imaging device is likely to be subjected to an electromagnetic interference. Hereinafter, an environment in which imaging devices are likely to be subjected to such an electromagnetic interference is referred to as an "intense electric field environment". If an imaging device such as a digital still camera is used in the intense electric field environment, an image taken by the imaging device may contain a stripe pattern noise (beat noise), and image interference may be caused.

The higher a performance of an imaging sensor of the imaging device is (the higher the sensitivity of an imaging sensor to be used is), the more significant the image interference is. Further, in an imaging sensor built into an imaging device having been downsized as a result of the sizes of imaging devices being reduced, an amount of coupling of intense electric field noise from the outside is increased, so that the image interference becomes more significant.

Causes of the image interference include entering of an external electromagnetic wave into, for example, an image signal line of an imaging sensor. Thus, as the conventional arts, a structure is disclosed in which an electrically-conductive filter is additionally provided on a surface of a lens, and an imaging sensor is shielded from intense electric field noises which may enter the imaging sensor (see, for example, Japanese Laid-Open Patent Publication No. 2008-211378).

SUMMARY

It is considered that a metal plate is mounted to the reverse side of the imaging sensor, in order to dissipate heat generated in the imaging sensor. However, when the metal plate is subjected to an electromagnetic wave from the outside, the metal plate secondarily radiates the electromagnetic wave. Although heat generated in the imaging sensor is dissipated by means of the metal plate, the metal plate enhances electromagnetic field noises that enter the imaging sensor. If an electrically-conductive filter is provided on a surface of a lens as in the conventional imaging device in order to address such a problem, although the metal plate can be restrained from secondarily radiating the electromagnetic wave, an amount of light incident on the lens is reduced, thereby deteriorating an image quality.

Thus, the present disclosure is to make available an imaging device that allows image interference caused by an external noise to be reduced also when the imaging device is used in intense electric field environments.

The present disclosure is directed to an imaging device that allows image interference caused by an external noise to be reduced. In order to attain the aforementioned object, the imaging device of the present disclosure includes: an imaging sensor configured to capture an optical image of an object, and generate image data; a main circuit substrate, disposed behind the imaging sensor, configured to perform signal processing of the image data generated by the imaging sensor; a mounting component configured to mount the imaging sensor; a metal plate disposed between the mounting component and the main circuit substrate; and an electrically-conductive section configured to electrically connect between a ground conductor of the main circuit substrate and the metal plate. The electrically-conductive section is positioned in an area where the metal plate and the imaging sensor overlap each other in the case of a back surface of the metal plate being viewed in a direction orthogonal thereto.

For example, the electrically-conductive section is formed so as to be elastically deformable. Alternatively, the electrically-conductive section is a back-surface-side projection that projects from a surface of the metal plate on the main circuit substrate side.

For example, the main circuit substrate has the ground conductor embedded therein. In the main circuit substrate, an introduction portion is formed, as an opening or a cut portion, in a portion of an insulating layer that covers the ground conductor, on a surface on the metal plate side, and the electrically-conductive section is connected to the ground conductor via the introduction portion.

For example, in the main circuit substrate, an integrated circuit for AD conversion for performing digital conversion of the image data is disposed, in an area near the introduction portion, on the same surface as the surface on which the introduction portion is formed. Alternatively, in the main circuit substrate, an integrated circuit for AD conversion for performing digital conversion of the image data is disposed, in an area opposite to an area of the introduction portion, on a surface reverse of the surface on which the introduction portion is formed.

For example, a portion of the electrically-conductive section is positioned in the area where the metal plate and the imaging sensor overlap each other in the case of the back surface of the metal plate being viewed in the direction orthogonal thereto.

As described above, in the imaging device of the present disclosure, since a potential of the metal plate becomes stable, also when the imaging device is used in an intense electric field environment, image interference caused by an external noise can be reduced. These and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a cross-sectional view of an internal structure of an imaging device 100, as viewed from thereabove, according to the first embodiment of the present disclosure;

FIG. 6A is a perspective view of a main circuit substrate 120;

FIG. 6B is a perspective view of the main circuit substrate 120 to which an electrically-conductive section 190 has been connected;

FIG. 7A is a cross-sectional view of an internal structure of an imaging device 200, as viewed from thereabove, according to a second embodiment of the present disclosure;

FIG. 7B is a perspective view of a metal plate 150;

FIG. 9A is a perspective view of the main circuit substrate 120;

FIG. 9B is a perspective view of the main circuit substrate 120 to which the electrically-conductive section 190 has been connected.

DETAILED DESCRIPTION

Hereinafter, exemplary embodiments of the present disclosure will be described with reference to the drawings.

First Embodiment

Figure 1:
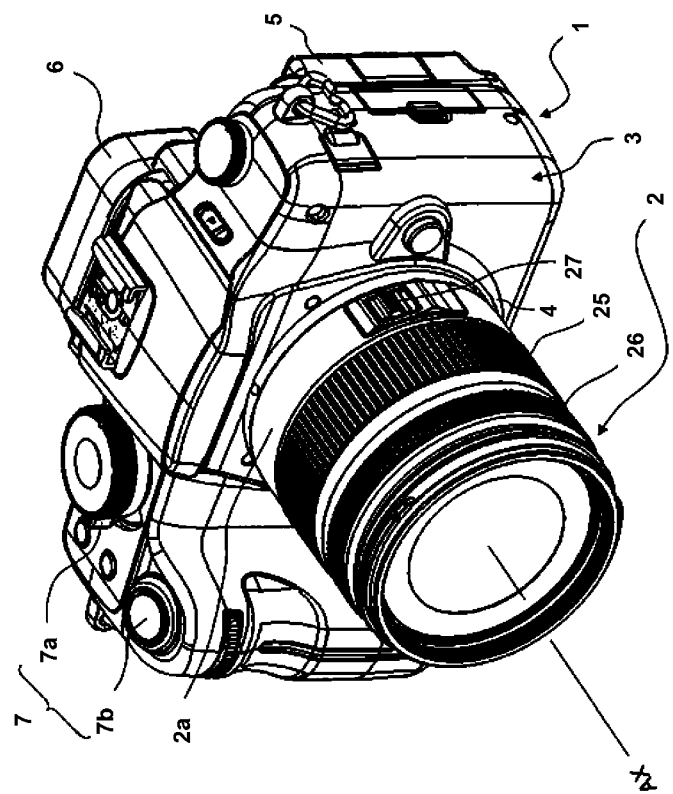
FIG. 1 is a perspective view of an outer appearance of a digital camera (which is an exemplary imaging device) according to a first embodiment of the present disclosure.
Figure 2:
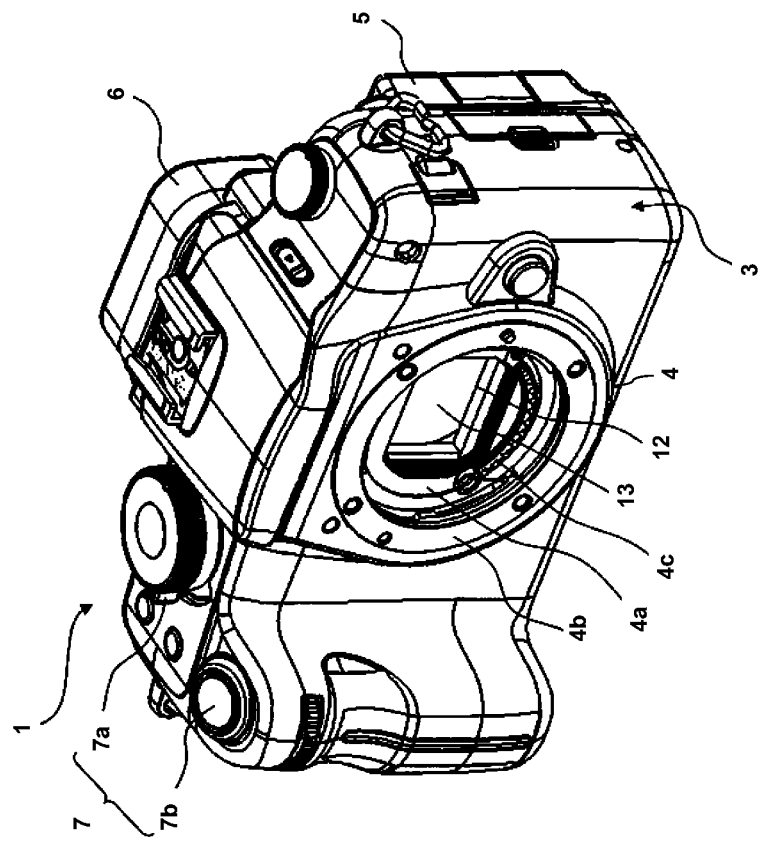
FIG. 2 is a perspective view of an outer appearance of a camera main body 1 from which an exchangeable lens unit 2 is removed.
Figure 3:
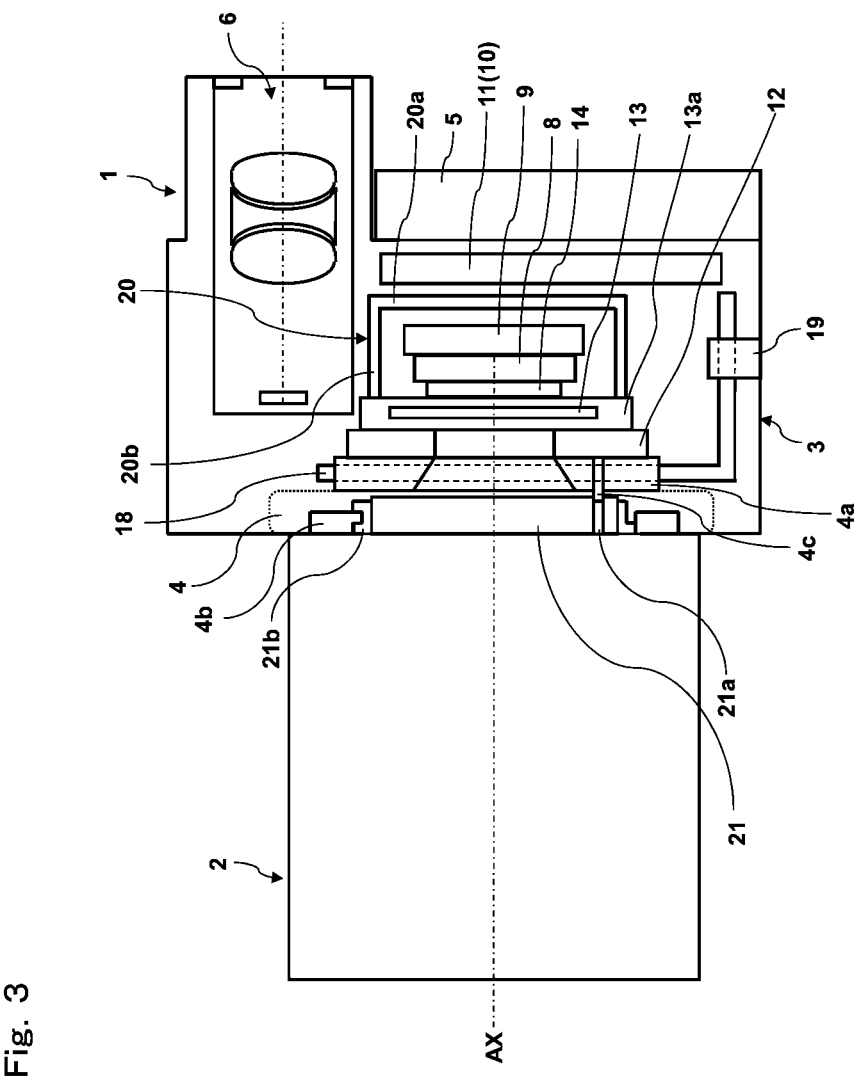
FIG. 3 is a schematic cross-sectional view of an internal structure of the digital camera.
Figure 4:
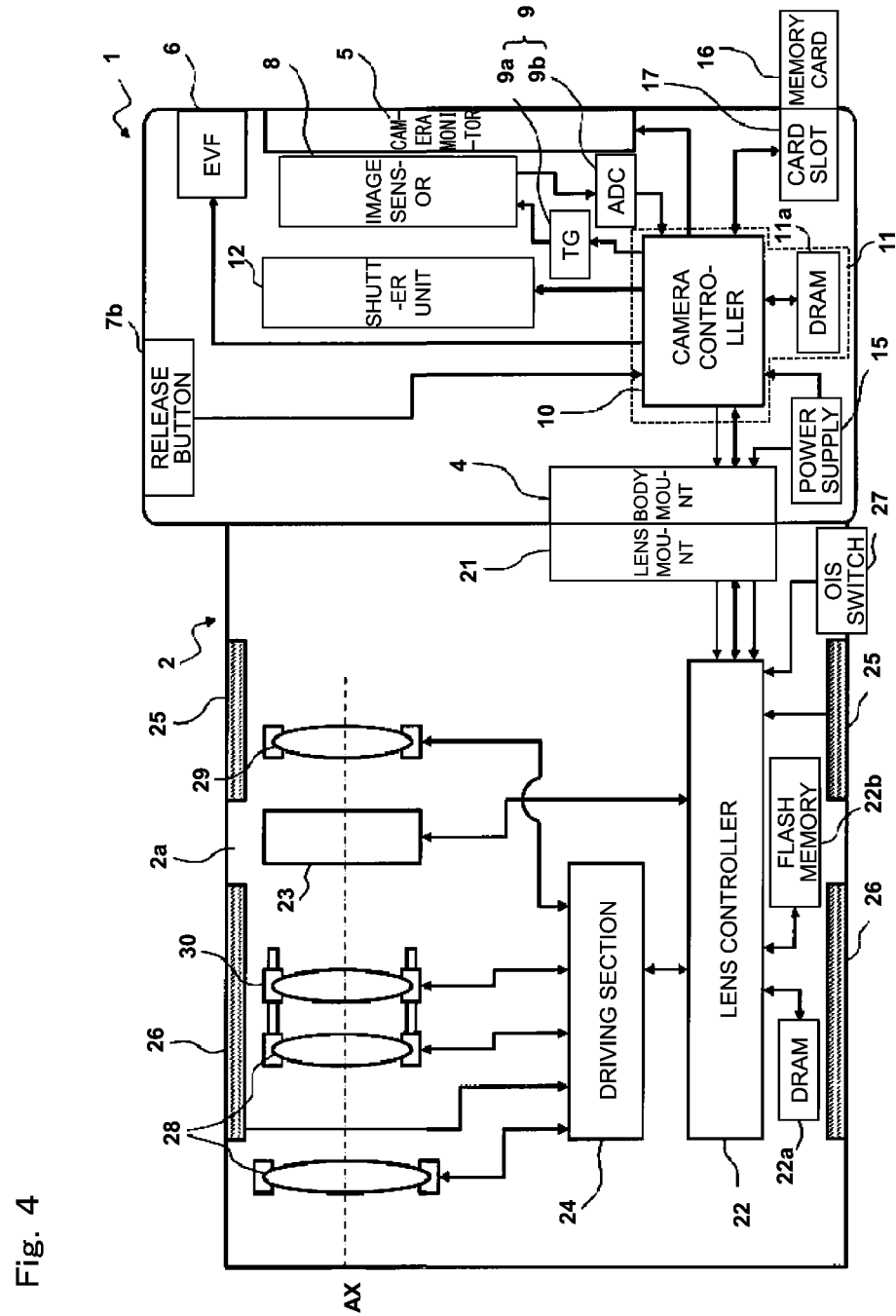
FIG. 4 is a functional block diagram illustrating the digital camera.

FIG. 1 is a perspective view of an outer appearance of a digital camera (which is an exemplary imaging device) according to a first embodiment of the present disclosure. The digital camera according to the first embodiment includes a camera main body 1 and an exchangeable lens unit 2 which is mountable to the camera main body 1. FIG. 2 is a perspective view of an outer appearance of the camera main body 1 from which the exchangeable lens unit 2 is removed. FIG. 3 is a schematic cross-sectional view of an internal structure of the digital camera. FIG. 4 is a functional block diagram illustrating the digital camera.

Firstly, referring to FIG. 1 to FIG. 4, a fundamental structure of the digital camera according to the first embodiment will be described. In the description herein, for convenience of description, an object side of the digital camera is referred to as the front, and an imaging plane side of the digital camera is referred to as the rear or the back.

As shown in FIG. 1, the camera main body 1 includes a main body casing 3, a body mount 4, a camera monitor 5, an electronic view finder (EVF) 6, and an operation section 7. The body mount 4 is disposed on the front surface side of the main body casing 3, and allows the exchangeable lens unit 2 to be mounted to the camera main body 1. The camera monitor 5 is disposed on the back surface side of the main body casing 3, and is implemented as a liquid crystal display or the like. The EVF 6 is disposed on the back surface side of the main body casing 3, and displays, for example, an image represented by display image data. The operation section 7 is disposed on the top portion of the main body casing 3, and includes, for example, a power switch 7a, and a release button 7b that receives a shutter operation from a user.

The exchangeable lens unit 2 has, in a lens barrel 2a made of a resin, an optical system including a group of lenses 28, 29, and 30 that are arrayed on an optical axis AX for forming an optical image of an object. On the outer circumferential portion of the lens barrel 2a, a zoom ring 25, a focus ring 26, and an OIS (Optical Image Stabilizer) switch 27 are provided. In the exchangeable lens unit 2, positions of lenses in the lens barrel 2a can be adjusted by rotating the zoom ring 25 and the focus ring 26.

As shown in FIG. 2, the body mount 4 is structured so as to allow the exchangeable lens unit 2 to be mounted to the camera main body 1. The body mount 4 includes a terminal support section 4a, a body mount ring 4b, and a connection terminal 4c. On the front surface of the camera main body 1 on which the exchangeable lens unit 2 is mounted to the camera main body 1, a shutter unit 12 and a diaphragm 13 are provided.

As shown in FIG. 3, in the main body casing 3 of the camera main body 1, a circuit substrate 9 (mounting component) on which an image sensor 8 implemented as a CMOS (Complementary Metal Oxide Semiconductor) or a CCD (Charge Coupled Device) is mounted, and a main circuit substrate 11 including a camera controller 10, are provided. Further, in the main body casing 3 of the camera main body 1, the body mount 4, the shutter unit 12, the diaphragm 13, an optical low pass filter 14, the image sensor 8, the circuit substrate 9, a metal component 20, the main circuit substrate 11, and the camera monitor 5 are disposed in order, respectively, from the front.

A diaphragm support section 13a supports the diaphragm 13 such that the diaphragm 13 is disposed at a determined position relative to the image sensor 8. The diaphragm support section 13a is supported by a main frame 18 via the body mount 4 and the shutter unit 12. The diaphragm 13 and the diaphragm support section 13a prevent dust from attaching to the image sensor 8.

The optical low pass filter 14 removes a high frequency component of light of an object such that an object image which is formed by the exchangeable lens unit 2 has a resolution lower than that based on pitches of pixels of the image sensor 8. In general, in an imaging sensor such as the image sensor 8, a color filter, for RGB colors, which includes an array called a Bayer array and/or a complementary color filter for YCM colors, are arranged for each pixel. Thus, if an image of an object is formed with the same resolution as that of the image sensor, not only a false color occurs, but also a moire phenomenon occurs to make viewing difficult in the case of a repeated pattern of an object. Thus, the optical low pass filter 14 is disposed so as to avoid such a problem. The optical low pass filter 14 has an IR protection filter function for filtering out infrared light.

The main frame 18 that is made of a metal and is disposed in the main body casing 3 is connected to the terminal support section 4a of the body mount 4, and supports the exchangeable lens unit 2 via the body mount 4. Further, a tripod mounting section 19 having a screw hole for mounting a tripod is mechanically connected to the main frame 18. The screw hole of the tripod mounting section 19 is exposed on the bottom surface of the main body casing 3. Further, the metal component 20 disposed so as to surround the circuit substrate 9 to which the image sensor 8 has been mounted is a component for enhancing dissipation of heat generated in the image sensor 8. The metal component 20 includes a metal plate 20a (orthogonal to the optical axis AX) disposed between the circuit substrate 9 and the main circuit substrate 11, and a thermally-conductive section 20b (parallel to the optical axis AX) for transferring heat from the metal plate 20a to the body mount 4.

The body mount 4 is a component for mounting the exchangeable lens unit 2 to the camera main body 1. The body mount 4 is mechanically and electrically connected to a lens mount 21 of the exchangeable lens unit 2. The body mount 4 includes: the body mount ring 4b that is made of a metal, is ring-shaped, and is mounted to the front surface of the main body casing 3; and the connection terminal 4c provided in the terminal support section 4a. A connection terminal 21a provided in the lens mount 21 is electrically connected to the connection terminal 4c when the exchangeable lens unit 2 is mounted to the camera main body 1.

The body mount ring 4b of the body mount 4 and a lens mount ring 21b that is made of a metal and is provided in the lens mount 21 of the exchangeable lens unit 2, fit into each other, whereby the exchangeable lens unit 2 is mechanically held by the camera main body 1. The lens mount ring 21b fits into the body mount ring 4b by means of a so-called bayonet mechanism.

Specifically, the lens mount ring 21b is put into a first state in which the lens mount ring 21b does not fit into the body mount ring 4b or a second state in which the lens mount ring 21b fits into the body mount ring 4b, according to a relationship in rotated position about the optical axis between the body mount ring 4b and the lens mount ring 21b. In the first state, the lens mount ring 21b is movable relative to the body mount ring 4b in the optical axis direction, and can be inserted into the body mount ring 4b. When the lens mount ring 21b is rotated relative to the body mount ring 4b in a state where the lens mount ring 21b has been inserted into the body mount ring 4b, the lens mount ring 21b fits into the body mount ring 4b. At this time, a relationship in rotated position between the body mount ring 4b and the lens mount ring 21b represents the second state.

Further, the connection terminal 4c electrically contacts with the connection terminal 21a of the lens mount 21 in a state where the exchangeable lens unit 2 is mounted to the camera main body 1. Thus, the body mount 4 and the lens mount 21 are electrically connected to each other via the connection terminal 4c of the body mount 4 and the connection terminal 21a of the lens mount 21. As a result, in the digital camera, image data signals and control signals can be transmitted and received between the camera main body 1 and the exchangeable lens unit 2 via the body mount 4 and the lens mount 21.

Referring to FIG. 4, an internal function of the camera main body 1 will be firstly described in detail.

The body mount 4 and the lens mount 21 are connected to each other such that image data and control signals can be transmitted and received between the camera controller 10 and a lens controller 22 provided in the exchangeable lens unit 2. Further, in the main body casing 3, a power supply block 15 implemented as, for example, a battery is provided for supplying power to each component such as the camera controller 10. The power supply block 15 also supplies power to the entirety of the exchangeable lens unit 2 via the body mount 4 and the lens mount 21.

The image sensor 8 operates based on a timing signal supplied from a timing signal generator (TG) 9a mounted to the circuit substrate 9, and converts, to image data, an object image which is an optical image of an object obtained via the exchangeable lens unit 2, to generate still image data, moving image data, or the like. Image data, such as the still image data or moving image data, generated by the image sensor 8 is converted to a digital signal by an ADC (analog-to-digital converter) 9b mounted to the circuit substrate 9, and is subjected to various image processing by the camera controller 10. The various image processing performed by the camera controller 10 includes, for example, a gamma correction process, a white balance correction process, a flaw correction process, a YC conversion process, an electronic zoom process, and a JPEG compression process. The function of the circuit substrate 9 may be included in the main circuit substrate 11.

Further, the image data generated by the image sensor 8 is used for displaying a through-the-lens image. The through-the-lens image is an image represented by moving image data, and the data of the through-the-lens-image is not stored in a memory card 16. The through-the-lens image is displayed on the camera monitor 5 and/or the EVF 6 in order to compose a moving image or a still image.

The camera controller 10 is mounted to the main circuit substrate 11. The camera controller 10 controls each component of the camera main body 1, and transmits a signal for controlling the exchangeable lens unit 2, to the lens controller 22, via the body mount 4 and the lens mount 21. On the other hand, the camera controller 10 receives various signals from the lens controller 22 via the body mount 4 and the lens mount 21. Thus, the camera controller 10 indirectly controls each component of the exchangeable lens unit 2.

Further, the camera controller 10 uses, as a work memory, a DRAM 11a mounted to the main circuit substrate 11 during a control operation and an image processing operation. Further, a card slot 17 is formed for inputting from and outputting to the memory card 16 mounted to the camera main body 1 still image data and moving image data, according to a control signal transmitted from the camera controller 10.

The shutter unit 12 is a so-called focal plane shutter. The shutter unit 12 is disposed between the body mount 4 and the image sensor 8, and can shield the image sensor 8 from light. The shutter unit 12 includes a first shutter curtain, a second shutter curtain, and a shutter support frame having an opening through which light is guided from an object to the image sensor 8. The shutter unit 12 moves to or retracts from the opening of the shutter support frame the first shutter curtain and the second shutter curtain, to adjust an exposure time of the image sensor 8.

Next, an internal function of the exchangeable lens unit 2 will be described in detail.

The exchangeable lens unit 2 has, in the lens barrel 2a made of a resin, the optical system including a group of lenses 28, 29, and 30 arrayed on the optical axis AX for forming an optical image of an object, the lens mount 21, the lens controller 22, an aperture unit 23, and a driving section 24 for driving the group of lenses 28, 29, and 30 of the optical system.

Further, the zoom ring 25, the focus ring 26, and the OIS switch 27 are provided on the outer circumferential portion of the lens barrel 2a. The exchangeable lens unit 2 is allowed to adjust positions of the lenses in the lens barrel 2a by the zoom ring 25 and the focus ring 26 being rotated.

The optical system has a group of lenses 28 for zooming, a group of lenses 29 for OIS, and a group of lenses 30 for focusing. The group of lenses 28 for zooming operates so as to change a focal distance of the optical system. The group of lenses 29 for OIS operates so as to restrain, for the image sensor 8, blurring of an object image which is formed by the optical system. The group of lenses 30 for focusing operates so as to change a focus state of an object image formed on the image sensor 8 by the optical system.

The aperture unit 23 is a light amount adjustment component that adjusts an amount of light transmitted through the optical system. Specifically, the aperture unit 23 includes aperture blades that can block a portion of light beams transmitted through the optical system, and an aperture driving section for driving the aperture blades.

The driving section 24 drives the group of lenses 28, 29, and 30 of the optical system described above, based on a control signal from the lens controller 22. The driving section 24 has a detection section for detecting positions of the group of lenses 28, 29, and 30 of the optical system.

The lens controller 22 controls the entirety of the exchangeable lens unit 2 based on a control signal transmitted from the camera controller 10 of the camera main body 1. The lens controller 22 receives positional information of the group of lenses 28, 29, and 30 of the optical system as detected by the detection section of the driving section 24, and transmits the positional information to the camera controller 10. The camera controller 10 generates a control signal for controlling the driving section 24 based on the positional information received from the lens controller 22, and transmits the control signal to the lens controller 22.

The lens controller 22 transmits, to the driving section 24, the control signal generated by the camera controller 10. The driving section 24 adjusts positions of the group of lenses 28, 29, and 30 based on the control signal transmitted from the lens controller 22.

On the other hand, the camera controller 10 generates a control signal for operating the aperture unit 23, based on information indicating, for example, an amount of light received by the image sensor 8, whether a still image is to be photographed or a moving image is to be photographed, and whether or not an operation is being performed so as to preferentially set an aperture value. At this time, the lens controller 22 relays the control signal generated by the camera controller 10, to the aperture unit 23.

A DRAM 22a and a flash memory 22b are held in the exchangeable lens unit 2. The lens controller 22 uses the DRAM 22a as a work memory when drives the group of lenses 28, 29, and 30 of the optical system and the aperture unit 23. In the flash memory 22b, programs and parameters used by the lens controller 22 are stored.

Thus, the digital camera (which is an exemplary imaging device) according to the first embodiment has been described with reference to FIG. 1 to FIG. 4. However, the imaging device may be another imaging device which uses an electrically-conductive section connecting between a metal plate described below, and the main circuit substrate.

Hereinafter, connection between a metal plate and the main circuit substrate will be described in detail as means for reducing image interference caused by an external noise.

FIG. 5 is a cross-sectional view of an internal structure of an imaging device 100, as viewed from thereabove, according to the first embodiment. In the description herein, control of a GND potential by a metal plate 150 will be mainly described, and detailed description of matters other than the control is omitted. The fundamental structure of the imaging device 100 is the same as described for the digital camera with reference to FIG. 1 to FIG. 4. The "GND" may be represented as "ground" or "earth".

As shown in FIG. 5, the imaging device 100 includes an imaging sensor 110, a main circuit substrate 120, an imaging sensor flexible cable 130, a mount 140, a metal plate 150, connection sections 160, and an electrically-conductive section 190. The electrically-conductive section 190 is formed of a metal having a high electrical conductivity. The main circuit substrate 120 has a GND removal portion 180 (introduction portion) on the front surface on the metal plate 150 side. Further, the main circuit substrate 120 has an AD conversion LSI 185 (an integrated circuit for AD conversion) for performing a digital conversion of image data generated by the imaging sensor 110, on the back surface on a side opposite to the metal plate 150 side.

The imaging sensor 110 is implemented as, for example, a CMOS or a CCD, and corresponds to the image sensor 8 described above. On the front surface of the imaging sensor 110, an object image which is an optical image of an object obtained via the group of lenses 28, 29, and 30, is formed. The imaging sensor 110 converts the object image into image data, to generate still image data, moving image data, or the like.

The main circuit substrate 120 corresponds to the main circuit substrate 11 described above. The main circuit substrate 120 includes the camera controller 10 that performs various signal processing of the image data generated by the imaging sensor 110. In the description herein, the various signal processing is the image processing described above, and includes, for example, a gamma correction process, a white balance correction process, a flaw correction process, a YC conversion process, an electronic zoom process, and a JPEG compression process. The main circuit substrate 120 is a rectangular substrate having an area greater than that of the imaging sensor 110. The main circuit substrate 120 is fixed to the main body casing 3 behind the imaging sensor 110 so as to be almost parallel to the imaging sensor 110. Further, the main circuit substrate 120 is a multilayered substrate having a GND layer (GND conductor) thereinside. On the main circuit substrate 120, the GND removal portion 180 (a so-called land) is formed as an exposed portion of the GND layer by a portion of an insulating layer that covers the GND layer being removed.

The imaging sensor flexible cable 130 has four cable end connection portions that are connected to the main circuit substrate 120, and is formed so as to be roughly H-shaped. The imaging sensor flexible cable 130 includes a pair of band portions each having the cable end connection portions on both ends, and a rectangular central connection portion connecting between central portions of the paired band portions. The paired band portions are spaced from each other and extend parallel to each other. In the imaging sensor flexible cable 130, the band portions correspond to longitudinal lines, respectively, of the H shape, and the central connection portion corresponds to a transverse line of the H shape. The imaging sensor flexible cable 130 corresponds to, for example, the circuit substrate 9 described above, and allows the imaging sensor 110 to be mounted to the central connection portion. The imaging sensor 110 is mounted so as to protrude from the central connection portion toward each band portion. A plurality of signal lines are embedded in each band portion so as to extend from each cable end connection portion to the imaging sensor 110. The imaging sensor flexible cable 130 is supported by the main circuit substrate 120 by each cable end connection portion being connected to the main circuit substrate 120.

The mount 140 corresponds to, for example, the body mount 4 described above. The mount 140 is a component for allowing the lens unit 2 to be mounted to the main body casing 3. The mount 140 is fixed to the main body casing 3 and has a GND potential. The mount 140 secures an SSWF (Super Sonic Wave Filter) (not shown) for removing dust on the surface of the imaging sensor 110, a shutter unit (not shown), and a flash unit (not shown). Further, the mount 140 is formed of a metal material such as aluminum or a stainless steel (SUS), in order to enhance reliability in heat-dissipation and reliability against drop impact, and to address unnecessary electromagnetic radiation.

The metal plate 150 is formed in a roughly rectangular shape. The metal plate 150 is disposed between the imaging sensor 110 and the main circuit substrate 120. The metal plate 150 is provided so as to be almost parallel to the main circuit substrate 120. The metal plate 150 is electrically connected to the GND removal portion 180 of the main circuit substrate 120 via the electrically-conductive section 190. A connection portion between the GND removal portion 180 and the electrically-conductive section 190 will be described below in detail.

Further, the metal plate 150 corresponds to, for example, the metal plate 20a of the metal component 20 described above. The metal plate 150 is fixed to a mounting area of the imaging sensor flexible cable 130, or disposed near the mounting area, in order to transfer heat generated in the imaging sensor 110. In the first embodiment, the metal plate 150 is adhered to an area opposite to the mounting area. The metal plate 150 is formed of a metal material, such as aluminum or copper, having a high thermal conductivity and electrical conductivity, to efficiently dissipate heat transferred from the imaging sensor 110.

The connection sections 160 are components that electrically connect between the mount 140 and the metal plate 150. The connection sections 160 are typically screws made of a metal material. The number of the connection sections 160 provided is plural. The connection sections 160 fix the mount 140 and the metal plate 150 to each other.

Next, a connection portion between the main circuit substrate 120 and the electrically-conductive section 190 will be specifically described. FIG. 6A is a perspective view of the main circuit substrate 120. As shown in FIG. 6A, the main circuit substrate 120 has the GND removal portion 180 on the front surface on the metal plate 150 side. The GND removal portion 180 is an area on the front surface of the main circuit substrate 120 in which a resist is removed, and has a GND potential. FIG. 6B is a perspective view of the main circuit substrate 120 to which the electrically-conductive section 190 has been connected. As shown in FIG. 6B, on the main circuit substrate 120, the GND removal portion 180 and the electrically-conductive section 190 are connected to each other. The shape of the electrically-conductive section 190 in a portion where the electrically-conductive section 190 contacts with the metal plate 150 is not limited to the shape as shown in FIG. 5 and FIG. 6B. Further, an area of the portion in which the electrically-conductive section 190 contacts with the metal plate 150 is favorably great in light of heat dissipating performance and the like.

The electrically-conductive section 190 is positioned in an area where the metal plate 150 and the imaging sensor 110 overlap each other in the case of the back surface of the metal plate 150 being viewed in the direction orthogonal thereto. In the present embodiment, the entirety of the electrically-conductive section 190 is positioned in the area where the metal plate 150 and the imaging sensor 110 overlap each other in the case of the back surface of the metal plate 150 being viewed in the direction orthogonal thereto. However, at least a portion of the electrically-conductive section 190 may be positioned in the area where the metal plate 150 and the imaging sensor 110 overlap each other in the case of the back surface of the metal plate 150 being viewed in the direction orthogonal thereto.

Further, the electrically-conductive section 190 may be an electrically-conductive elastic section having an elastic function in addition to electrical conductivity. The electrically-conductive elastic section is formed of a metal, such as aluminum or copper, having a high electrical conductivity, in an elastically deformable shape. When the electrically-conductive section 190 has an elastic function, a stress applied to the metal plate 150 adhered to the mounting area is reduced in the case of the electrically-conductive section 190 being pressed against the back surface of the metal plate 150. As a result, generation of stress applied to the imaging sensor 110 is restrained, and, for example, tilting of the imaging sensor 110 can be restrained. Further, in a case where the electrically-conductive section 190 has an elastic function, when the connection sections 160 that support the metal plate 150 are provided with elastic components, tilting of the imaging sensor 110 can be restrained with an enhanced effectiveness.

As described above, in the imaging device 100 according to the first embodiment, since the GND removal portion 180 of the main circuit substrate 120 and the metal plate 150 are electrically connected to each other via the electrically-conductive section 190, an impedance of GND of the metal plate 150 can be reduced. As a result, variation in GND potential in the imaging sensor 110 can be restrained while heat generated in the imaging sensor 110 can be dissipated by means of the metal plate 150.

Further, in the imaging device 100 according to the first embodiment, an electrically conductive filter for reducing an amount of light incident on the lenses is not used. Thus, also when the imaging device is used in an intense electric field environment, image interference caused by an external noise can be reduced without deteriorating an image quality of a captured image. Further, the electrically-conductive section 190 is not so large component, and has a simplified internal structure, thereby downsizing the imaging device.

Second Embodiment

FIG. 7A is a cross-sectional view of an internal structure of an imaging device 200, as viewed from thereabove, according to a second embodiment of the present disclosure. For the present embodiment, control of a GND potential by the metal plate 150 will be mainly described, and detailed description of matters other than the control is omitted. A fundamental structure of the imaging device 200 is the same as that of the digital camera described with reference to FIG. 1 to FIG. 4.

As shown in FIG. 7A, the imaging device 200 includes the imaging sensor 110, the main circuit substrate 120, the imaging sensor flexible cable 130, the mount 140, the metal plate 150, and the connection sections 160. Further, the main circuit substrate 120 has the GND removal portion 180 on the front surface on the metal plate 150 side. The main circuit substrate 120 has the AD conversion LSI 185 for performing a digital conversion of image data, on the back surface on a side opposite to the metal plate 150 side. The AD conversion LSI 185 is disposed, on the back surface of the main circuit substrate 120, in an area opposite to the GND removal portion 180 to which a metal plate projection 153 described below is connected. The metal plate 150 has the metal plate projection 153 on the back surface on the main circuit substrate 120 side. The metal plate projection 153 is structured so as to electrically connect between the metal plate 150 and the ground of the main circuit substrate 120, and corresponds to an electrically-conductive section. The entirety of the metal plate projection 153 is positioned in an area where the metal plate 150 and the imaging sensor 110 overlap each other in the case of the back surface of the metal plate 150 being viewed in the direction orthogonal thereto. Further, a shape of the metal plate projection 153 as viewed from the side thereof, is not limited to a trapezoidal shape as shown in FIG. 7A. Namely, the shape of the metal plate projection 153 is not limited to a frustum having a rectangular bottom surface. In FIG. 7A, the same components as those of the imaging device 100 according to the first embodiment as shown in FIG. 5 are denoted by the same reference numerals, and detailed description thereof is omitted. For the present embodiment, difference from the first embodiment will be mainly described.

FIG. 7B is a perspective view of the metal plate 150. In FIG. 7B, the metal plate 150 has the metal plate projection 153. The metal plate projection 153 is formed in a shape corresponding to the shape of the GND removal portion 180 of the main circuit substrate 120 shown in FIG. 6A, at a position corresponding to the position of the GND removal portion 180. The position and the shape of each of the GND removal portion 180 and the metal plate projection 153 are not limited to those shown in FIG. 6A and FIG. 7A. The positions and the shapes of the GND removal portion 180 and the metal plate projection 153 may be different from the positions and the shapes shown in FIG. 6A and FIG. 7A, and may be any positions and shapes that enable the GND removal portion 180 and the metal plate projection 153 to be electrically connected to each other.

Further, as described above, the mount 140 and the metal plate 150 are fixed to each other by means of the connection sections 160. Favorably, the connection sections 160 fix the mount 140 and the metal plate 150 such that the GND removal portion 180 and the metal plate projection 153 are in close contact with each other.

As described above, in the imaging device 200 according to the second embodiment, since the GND removal portion 180 of the main circuit substrate 120 and the metal plate projection 153 of the metal plate 150 are electrically connected to each other, an impedance of GND of the metal plate 150 can be reduced. As a result, variation in GND potential in the imaging sensor 110 can be restrained.

Further, in the imaging device 200 according to the second embodiment, an electrically conductive filter for reducing an amount of light incident on the lenses is not used. Thus, also when the imaging device is used in an intense electric field environment, image interference caused by an external noise can be reduced without deteriorating an image quality of a captured image. Further, the internal structure is simplified, thereby downsizing the imaging device.

Third Embodiment

Figure 8:
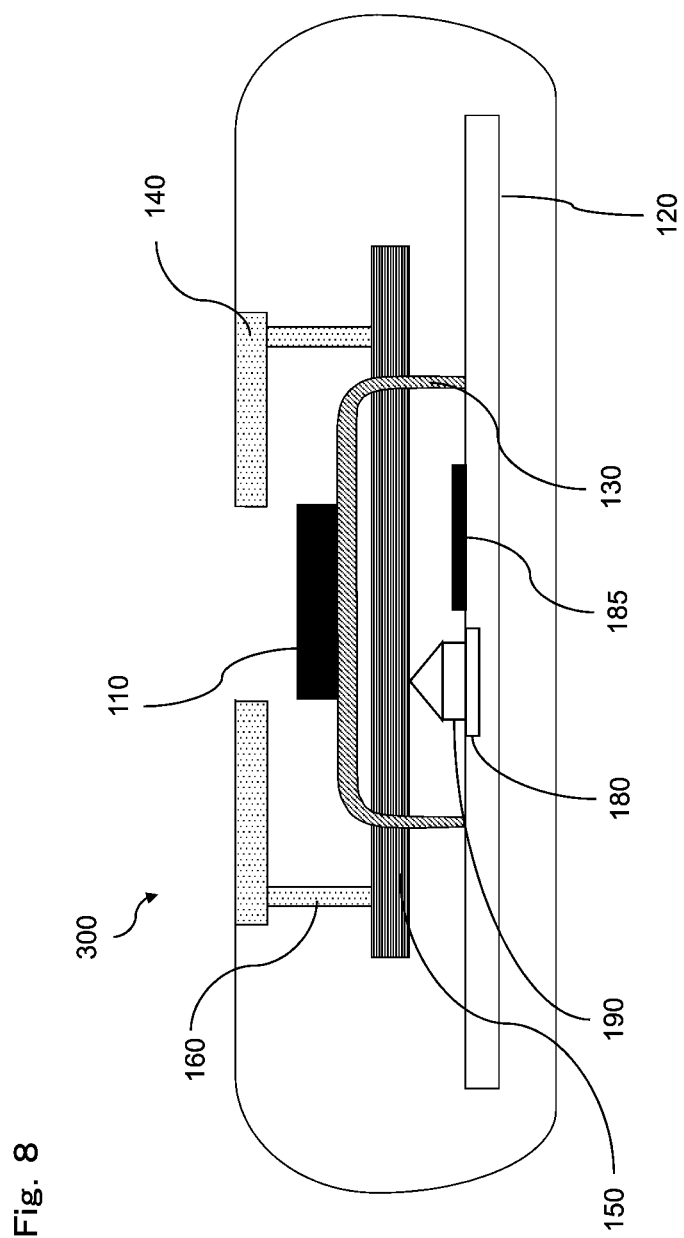
FIG. 8 is a cross-sectional view of an internal structure of an imaging device 300, as viewed from thereabove, according to a third embodiment of the present disclosure.

FIG. 8 is a cross-sectional view of an internal structure of an imaging device 300, as viewed from thereabove, according to a third embodiment of the present disclosure. For the present embodiment, difference from the first embodiment will be mainly described. A fundamental structure of the imaging device 300 is the same as that of the digital camera described with reference to FIG. 1 to FIG. 4.

As shown in FIG. 8, the imaging device 300 includes the imaging sensor 110, the main circuit substrate 120, the imaging sensor flexible cable 130, the mount 140, the metal plate 150, the connection sections 160, and the electrically-conductive section 190. Further, the main circuit substrate 120 has the GND removal portion 180 and the AD conversion LSI 185 on the front surface on the metal plate 150 side. In FIG. 8, the same components as those of the imaging device 100 according to the first embodiment as shown in FIG. 5 are denoted by the same reference numerals, and detailed description thereof is omitted. For the present embodiment, difference from the first embodiment will be mainly described.

The imaging device 300 according to the third embodiment is different from the imaging device 100 according to the first embodiment in that the AD conversion LSI 185 is mounted on a surface of the main circuit substrate 120 on the metal plate 150 side (namely, the same surface on which the GND removal portion 180 is formed) in the third embodiment. Further, the imaging device 300 is different from the imaging device 100 in that a portion of the electrically-conductive section 190 is positioned in an area where the metal plate 150 and the imaging sensor 110 overlap each other in the case of the back surface of the metal plate 150 being viewed in the direction orthogonal thereto, in the imaging device 300. FIG. 9A is a perspective view of the main circuit substrate 120. In FIG. 9A, the main circuit substrate 120 has the GND removal portion 180 and the AD conversion LSI 185 on the same surface. The AD conversion LSI 185 is disposed, on the front surface of the main circuit substrate 120, in an area near the GND removal portion 180 to which the electrically-conductive section 190 is connected. FIG. 9B is a perspective view of the main circuit substrate 120 to which the electrically-conductive section 190 has been connected. As shown in FIG. 9B, the GND removal portion 180 and the electrically-conductive section 190 are connected to each other on the main circuit substrate 120.

As described above, in the imaging device 300 according to the third embodiment, since the GND removal portion 180 of the main circuit substrate 120 and the metal plate 150 are electrically connected to each other via the electrically-conductive section 190, an impedance of GND of the metal plate 150 can be reduced. As a result, variation in GND potential in the imaging sensor 110 can be restrained.

Further, in the imaging device 300 according to the third embodiment, an electrically conductive filter for reducing an amount of light incident on the lenses is not used. Thus, also when the imaging device is used in an intense electric field environment, image interference caused by an external noise can be reduced without deteriorating an image quality of a captured image. Further, the internal structure is simplified, thereby downsizing the imaging device.

Fourth Embodiment

Figure 10:
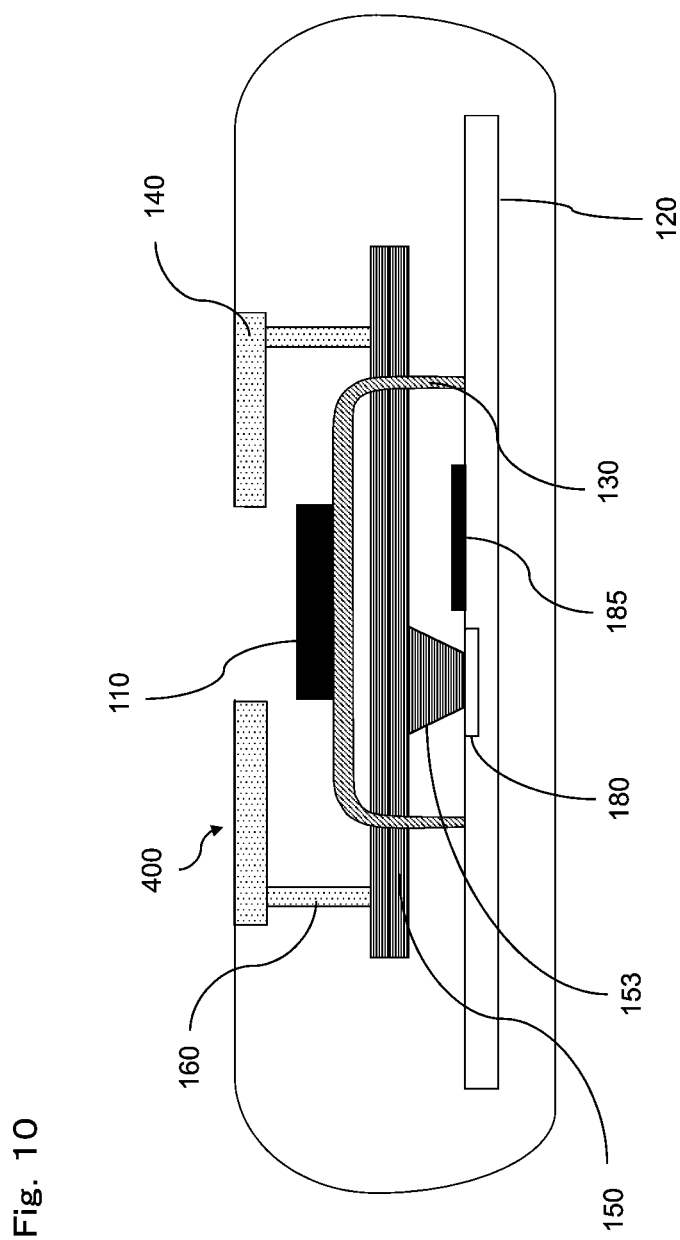
FIG. 10 is a cross-sectional view of an internal structure of an imaging device 400, as viewed from thereabove, according to a fourth embodiment of the present disclosure.

FIG. 10 is a cross-sectional view of an internal structure of an imaging device 400, as viewed from thereabove, according to a fourth embodiment of the present disclosure. For the present embodiment, difference from the second embodiment will be mainly described. A fundamental structure of the imaging device 400 is the same as that of the digital camera described with reference to FIG. 1 to FIG. 4.

As shown in FIG. 10, the imaging device 400 includes the imaging sensor 110, the main circuit substrate 120, the imaging sensor flexible cable 130, the mount 140, the metal plate 150, and the connection sections 160. Further, the main circuit substrate 120 has the GND removal portion 180 and the AD conversion LSI 185 on the front surface on the metal plate 150 side. The metal plate 150 has the metal plate projection 153 on the back surface on the main circuit substrate 120 side. In FIG. 10, the same components as those of the imaging device 200 according to the second embodiment as shown in FIG. 7A are denoted by the same reference numerals, and detailed description thereof is omitted. For the present embodiment, difference from the second embodiment will be mainly described.

The imaging device 400 according to a fourth embodiment is different from the imaging device 200 according to the second embodiment in that the AD conversion LSI 185 is mounted on the surface of the main circuit substrate 120 on the metal plate 150 side (namely, the same surface on which the GND removal portion 180 is formed), in the fourth embodiment. Further, the imaging device 400 is different from the imaging device 200 in that a portion of the metal plate projection 153 is positioned in an area where the metal plate 150 and the imaging sensor 110 overlap each other in the case of the back surface of the metal plate 150 being viewed in the direction orthogonal thereto, in the imaging device 400. The AD conversion LSI 185 is disposed, on the front surface of the main circuit substrate 120, in an area near the GND removal portion 180 to which the metal plate projection 153 is connected. The configuration of the main circuit substrate 120 is the same as shown in FIG. 9A for the third embodiment, and the description thereof is omitted.

As described above, in the imaging device 400 according to the fourth embodiment, since the GND removal portion 180 of the main circuit substrate 120 and the metal plate projection 153 of the metal plate 150 are electrically connected to each other, an impedance of GND of the metal plate 150 can be reduced. As a result, variation in GND potential in the imaging sensor 110 can be restrained.

Further, in the imaging device 400 according to the fourth embodiment, an electrically conductive filter for reducing an amount of light incident on the lenses is not used. Thus, also when the imaging device is used in an intense electric field environment, image interference caused by an external noise can be reduced without deteriorating an image quality of a captured image. Further, the internal structure is simplified, thereby downsizing the imaging device.

While the disclosure has been described in detail as above, the foregoing description is in all aspects illustrative and not restrictive. It will be understood that numerous other modifications and variations can be devised without departing from the scope of the disclosure.

What is claimed is:

1. An imaging device for taking an image of an object, the imaging device comprising:
   an imaging sensor configured to capture an optical image of an object, and generate image data;
   a main circuit substrate, including a ground conductor exposed on a surface of the main circuit substrate, disposed behind the imaging sensor, and configured to perform signal processing of the image data generated by the imaging sensor;
   a mounting component configured to mount the imaging sensor;
   a metal plate disposed between the mounting component and the main circuit substrate; and
   an electrically-conductive section being an electrically-conductive member joined to the ground conductor of the main circuit substrate and being in contact with the metal plate, the electrically-conductive section configured to electrically connect between the ground conductor and the metal plate, wherein
   the electrically-conductive section is positioned in an area where the metal plate and the imaging sensor overlap each other in the case of a back surface of the metal plate being viewed in a direction orthogonal thereto.

2. The imaging device of claim 1, wherein the electrically-conductive section is formed so as to be elastically deformable.

3. The imaging device of claim 1, wherein the electrically-conductive section is a back-surface-side projection that projects from a surface of the metal plate on the main circuit substrate side.

4. The imaging device of claim 1, wherein
   the main circuit substrate has the ground conductor embedded therein, and in the main circuit substrate,
   an introduction portion is formed, as an opening or a cut portion, in a portion of an insulating layer that covers the ground conductor, on a surface on the metal plate side, and
   the electrically-conductive section is connected to the ground conductor via the introduction portion.

5. The imaging device of claim 4, wherein
   in the main circuit substrate, an integrated circuit for AD conversion for performing digital conversion of the image data is disposed, in an area near the introduction portion, on the same surface as the surface on which the introduction portion is formed.

6. The imaging device of claim 4, wherein,
   in the main circuit substrate, an integrated circuit for AD conversion for performing digital conversion of the image data is disposed, in an area opposite to an area of the introduction portion, on a surface reverse of the surface on which the introduction portion is formed.

7. The imaging device of claim 1, wherein
   a portion of the electrically-conductive section is positioned in the area where the metal plate and the imaging sensor overlap each other in the case of the back surface of the metal plate being viewed in the direction orthogonal thereto.

* * * * *